Feb. 16, 1971 D. M. HARVEY 3,563,646
LAP DISSOLVE SYSTEM FOR TRANSPARENCY PROJECTION
Filed Jan. 31, 1969 2 Sheets-Sheet 1

DONALD M. HARVEY
INVENTOR.

BY
ATTORNEYS

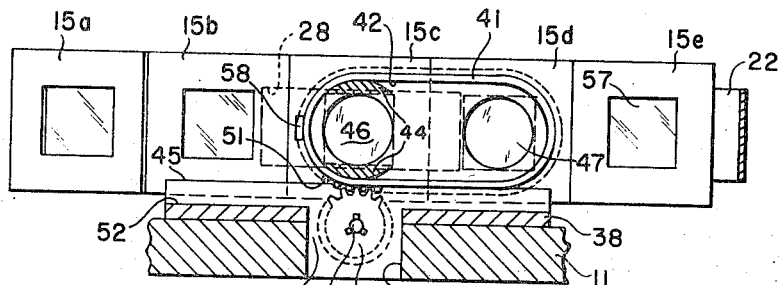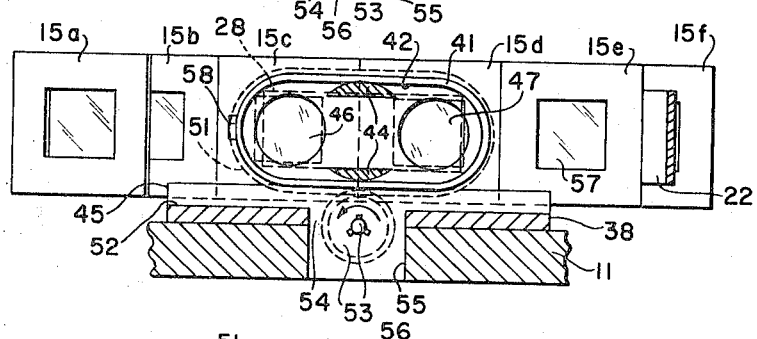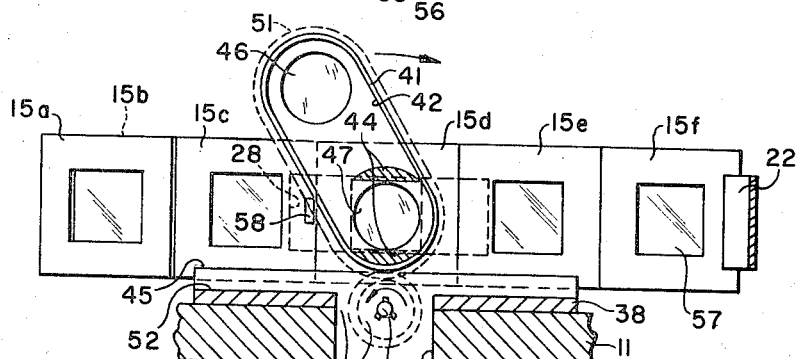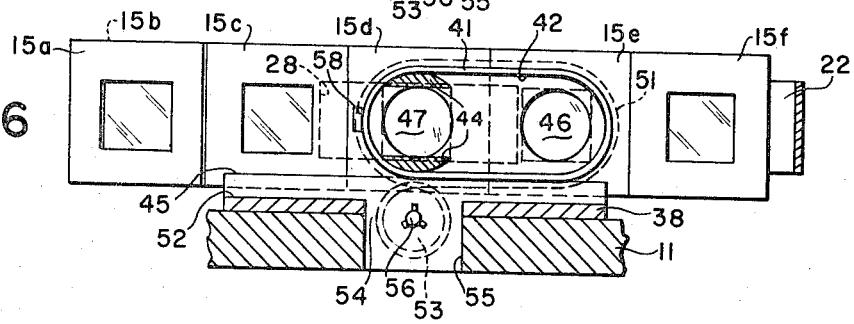

United States Patent Office 3,563,646
Patented Feb. 16, 1971

3,563,646
LAP DISSOLVE SYSTEM FOR TRANSPARENCY PROJECTION
Donald M. Harvey, Rochester, N.Y., assignor to Eastman Kodak Company, Rochester, N.Y., a corporation of New Jersey
Filed Jan. 31, 1969, Ser. No. 795,466
Int. Cl. G03b 27/78
U.S. Cl. 353—83                    10 Claims

ABSTRACT OF THE DISCLOSURE

A dissolving projector includes two objective lens systems movable laterally while in alignment with corresponding laterally movable slides or the like to concurrently remove one slide and its respective lens system from a projection position as the succeeding slide and its lens system move into that position; whereupon the lens system beyond the projection position is transposed into alignment with the slide to be displayed next to complete the repetitive slide changing cycle.

BACKGROUND OF THE INVENTION

Field of the invention

The present invention relates to optical projector devices and particularly to so-called lap dissolve projector devices adapted to project images of successive photographic transparencies or the like in a manner such that one projected image fades and disappears as the next image simultaneously comes into view.

Description of the prior art

To accomplish the above-described effect, thereby eliminating interruptions between successive projected images, projectors of the general type encompassed by the present invention include two similar stationary objective lens systems adapted alternately to project images of succesive information bearing surfaces, which typically comprise individual transparency slides. As each transparency is being projected by one lens system, the preceding one is removed from alignment with the other lens system and replaced by the one to be displayed next. To change from one image to the next, the illumination of the transparency being projected is gradually extinguished while the illumination of the transparency aligned with the other lens system is gradually increased to projection intensity; so that the image of the former fades away as the image of the latter simultaneously comes into view.

In most previously known projectors of this type, the necessity for alternating the projection position of successive slides has dictated the inconvenient use of two separate slide packs with the accompanying inexpedient requirement that the slides must be arranged in alternate sequential order in accordance with the desired projection sequence. Alternatively, means have been proposed for alternately delivering successive sides from a single slide pack to the two projection positions; but only at the expense of relatively complicated and inconvenient structures which are incapable of preserving the sequence of the slides to avoid the necessity for rearranging the slide pack each time it is to be displayed. Furthermore, since all these previously known projectors require the transparency being projected to remain stationary while the preceding and succeeding ones are being moved, such projectors are inherently incapable of being adapted to display successive image surfaces located in relatively immovable relation to one another along a film strip or the like.

SUMMARY OF THE INVENTION

In a projector according to the present invention, a succession of image bearing surfaces, e.g. slide transparencies, are arranged in tandem fashion and are moved intermittently in unison along a predetermined movement path into a projection position. As in the above-described devices, two substantially identical objective lens systems are provided; the first such lens system being aligned initially with the slide being projected and the second with the succeeding slide positioned out of the field of illumination of the light source. To change the displayed image, however, the aforementioned two slides and the lens systems repectively aligned therewith are all moved laterally in unison to remove the projected slide from alignment with the light source as the succeeding slide moves into that same projection position. Concurrently, the next slide to be displayed is also moved in the same tandem fashion into the position vacated by the slide then at the projection position. Thereupon, the first lens system is moved into alignment with the slide to be displayed next, without laterally moving the second lens system or otherwise disturbing the image being projected thereby; thus restoring the apparatus to its initial condition except for the reversal of the two lens systems. Accordingly, by means of this simple and straightforward arrangement, the same cycle can be repeated to display all of the available slides which are retained in order as they are discharged sequentially into a suitable receptacle. Furthermore, since the successive image bearing surfaces move in unison along a single path, the same type of apparatus can be adapted readily to display successive uniformly spaced images provided along a film strip or analogous unitary member.

Various means for practicing the invention and other advantages and features thereof will be apparent from the following detailed description of an illustrative embodiment of the invention, reference being made to the accompanying drawings in which like reference characters refer to like elements.

BRIEF DESCRIPTION OF THE DRAWINGS

In the drawings:
FIGS. 3-6 are somewhat schematic front views of the lens assembly of the projector, depicting four successive positions of the two lens systems of that assembly during the performance of a single slide changing operation.

DESCRIPTION OF THE ILLUSTRATIVE PREFERRED EMBODIMENT

Figure 2:
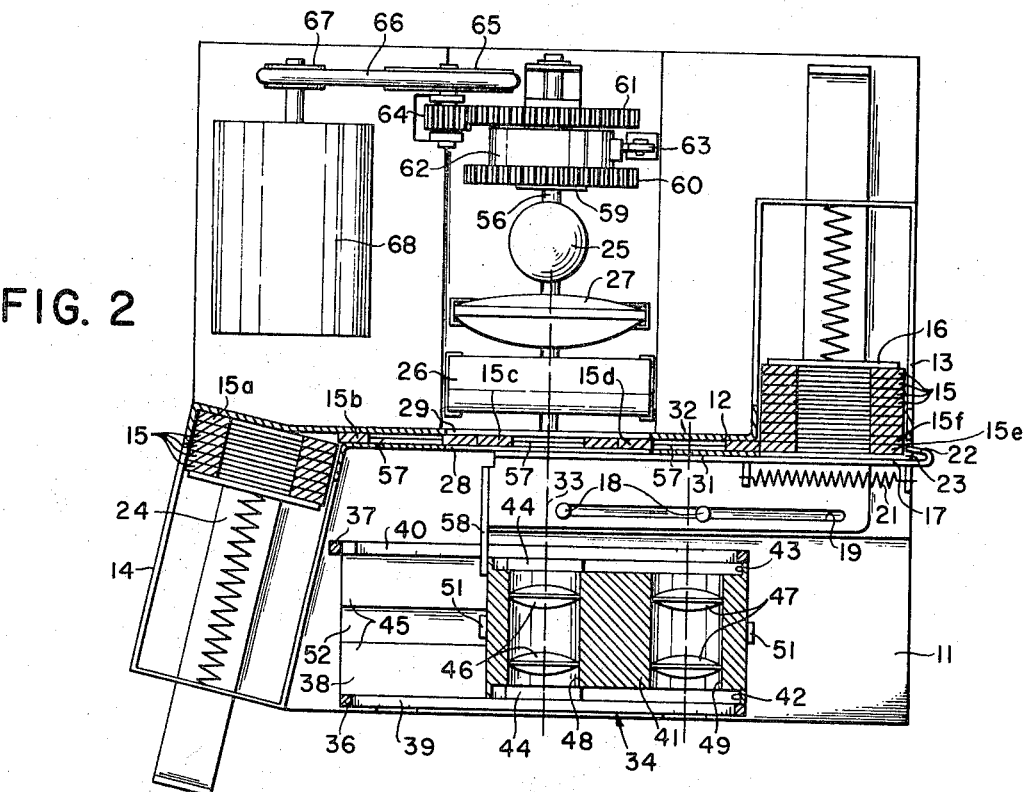
FIG. 2 is a partially cross sectioned plan view of the projector structure illustrated in FIG. 1.
Figure 1:
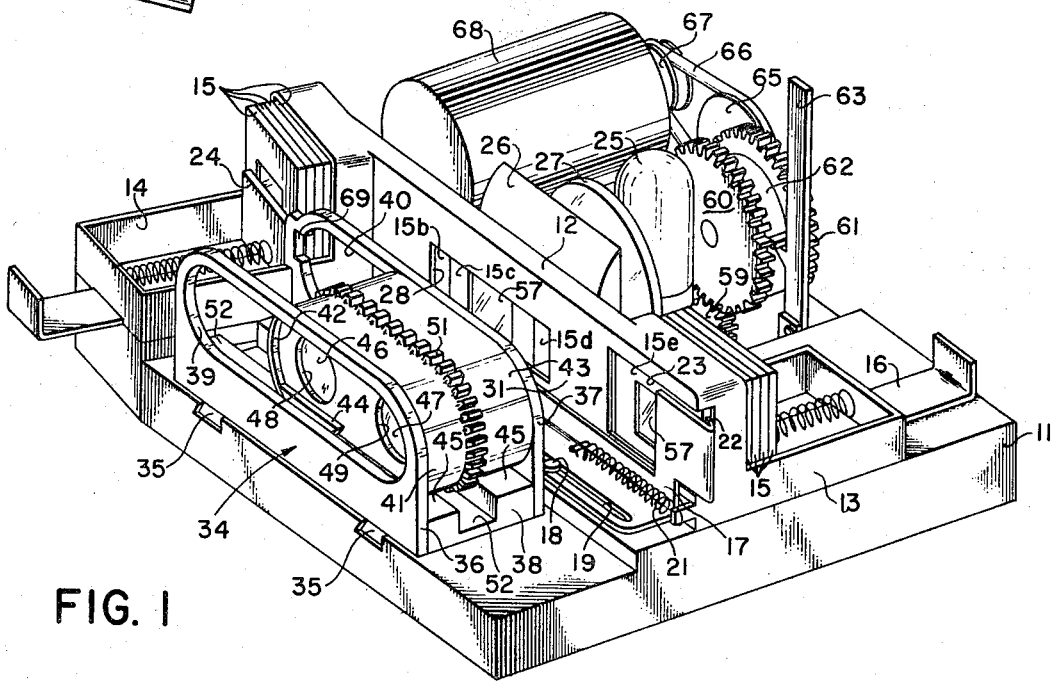
FIG. 1 is a perspective view of the basic structure of a slide projector according to the illustrative preferred embodiment of the invention.

As best shown in FIGS. 1 and 2 of the accompanying drawings, the illustrated projector comprises a base member 11 on which is mounted a slide changer assembly basically similar to previously known related slide changing structures. In this assembly, a slide gate member 12 extends between a slide receiving channel member 13 and a slide discharging channel member 14. To load the projector, a pack of conventional transparency slides 15 is loaded into channel member 13 and is urged forwardly by a spring loaded follower member 16. A slide advancing member 17 is slidably mounted to the front of the slide gate member by pins 18 extending through elongate slot 19 in the base portion of member 17 and is biased to the position shown in FIGS. 1 and 2 by a coil spring 21. In this position, slide engaging hook 22 on the slide advancing member extends through opening 23 in the gate member and is laterally aligned with the edge of the forwardmost slide in the slide receiving channel member. When the slide advancing member is moved laterally toward the center of the projector by a distance corresponding to the width of one slide, as will be described in detail below, that slide engaged by the slide engaging hook is thereby moved laterally out of the slide receiving channel member and along the slide gate member. Between the two channel members, the slide gate member is of sufficient length to accommodate three slides in guided tandem relation to one another, as is shown most clearly in FIG. 2. Accordingly, after three slides have been moved into the gate member, each succeeding operation of the slide advancing member moves one slide from the gate member into the slide receiving channel member; thereby returning the slides into stacked relation to one another in the same sequence in which they were loaded into the projector. As is most evident from FIG. 2, the slide receiving channel member is disposed at a slight angle to the gate member so that each successive slide thus enters the slide receiving channel member by displacing the preceding slides therein in opposition to spring loaded slide follower member 24.

The illumination system of the subject projector comprises a conventional internal reflector projection lamp 25 aligned with a pair of condenser lenses 26 and 27 located rearwardly of substantially identical openings 28 and 29 in the respective front and rear walls 31 and 32 of the film gate member. Whereas in most slide projectors the illumination system is adapted to illuminate a projection aperture area only as large as a single slide transparency, it will be apparent from the accompanying drawings that openings 28 and 29 in the gate member of the subject projector define a projection aperture considerably wider than the overall width of an entire slide. When a slide is aligned directly with the optical axis of the illumination system, indicated at numeral 33 in FIG. 2, the central image bearing transparency of that particular slide is located at the center of the aperture area, but as the slides are moved laterally to advance the next one to that position, portions of the transparencies of both such slides are illuminated temporarily within the gate aperture area. For this reason, the front condenser lens 26 preferably is of a cylindrical nature, as illustrated, in order that a maximum amount of the light available from lamp 25 can illuminate the elongate rectangular area of the gate aperture.

Forwardly of the slide gate member, the projection lens elements of the projector are carried by a support frame 34 attached to base member 11 by dovetail slides 35, which allow the support frame to be adjusted slightly in forward and rearward directions for focusing purposes. End plates 36 and 37 of the support frame extend upwardly from base block 38 thereof in parallel relation to one another and are provided with respective elongate openings 39 and 40. A lens support block 41, provided with semi-cylindrical end surfaces, is received between the upper portions of the two end plates surrounding openings 39 and 40, with the parallel edges of its peripheral front and rear lips 42 and 43 in sliding contact with the adjacent internal surfaces of those plates. In coaxial alignment with the central axis of the illumination system, the end plates are provided with respective pairs of identical partially cylindrical bearing segments 44, which project between the end lips at the corresponding ends of the lens block. The lower bearing segments are spaced above the coplanar flat upper surfaces 45 of base block 38 by a distance corresponding to the thickness of lips 42 and 43; with the external cylindrical surfaces of the bearing segments being of the same radii as the radii of the internal semi-cylindrical end surfaces of lips 42 and 43. Accordingly, the lens support block can slide laterally between the two end plates of the support frame with its flat lower surface in contact with base block 38 and can be rotated through 180° about the axis of either semi-cylindrical end thereof when that axis is coincident with the axis of the four bearing segments.

A pair of substantially identical projection lens systems 46 and 47 are supported in respective bores 48 and 49 in concentric relation to the axes of the corresponding semi-cylindrical end surfaces of the lens support block. The axes of the two lens systems are spaced apart by a distance equal to the width of one slide so that the two lens systems can be aligned simultaneously with the respective transparencies of two laterally adjacent slides within the slide gate member.

About its periphery, lens support block 41 is provided with a spur gear member 51, the lower portion of which is received in a slot 52 in base block 38. A pinion gear 53, shown schematically in FIGS. 3 through 6 is located directly below gear member 51 in an opening 54 in slot 52 of base block 38 and in a corresponding opening 55 in base member 11. Pinion gear 53 is carried by a horizontal rotatable drive shaft 56 and is meshed with gear member 51 directly below the axis of bearing segments 44. A splined connection between shaft 56 and pinion gear 53 allows the latter to remain meshed with gear member 51 as the support frame is adjusted on dovetail slides 35 for focusing purposes.

During the projection of a slide, the lens block is positioned as shown in FIGS. 1 through 3, so that the axis of the lens system nearest the slide discharging channel member is coincident with the axis of bearing segments 44 and with the center of the generally rectangular image bearing transparency 57 of that slide located midway along the projection aperture. For illustrative purposes, various slides depicted in the drawings are identified by numerals 15(a) through 15(f) with slide 15(c) being in projection position in FIGS. 1, 2 and 3. Concurrently, spring 21 positions slide advancing member 17 as shown in the same figures by virtue of the engagement of finger 58 thereof with the semi-cylindrical peripheral end surface of the lens block nearest the bearing segments. Obviously, a housing member, not shown, encloses the illustrated structure and prevents stray light from the projection lamp from interfering with the projection of the slide.

Shaft 56 is provided at its rearward end with another pinion 59 which is constantly meshed with a larger spur gear 60. The latter gear is connected to another gear 61, rotatable about the same axis, by means of a single revolution clutch 62 adapted to be operated by manual movement of lever 63. Gear 61, in turn, is constantly meshed with a smaller pinion 64 rotatable by pulley 65. A belt 66 connects pulley 65 to a smaller pulley 67 driven by a constantly rotating drive motor 68. Therefore, each time the single revolution clutch is engaged by manual movement of lever 63, the resulting single revolution of gear 60 causes shaft 56 and pinion gear 53 thereon to rotate in a counterclockwise direction, as viewed from the front, through a number of revolutions corresponding to the tooth ratio of pinion 59 and gear 60; which is twice the ratio between the number of teeth on pinion gear 53 and gear member 51 surrounding the lens block. Upon the commencement of such rotation of shaft 56 and pinion gear 53, the latter imparts clockwise torque to the lens support block. However, since the lens support block cannot rotate in a clockwise direction due to its contact with the flat upper surfaces 45 of base block 38, it slides laterally along the base block as shown in FIG. 4. This lateral movement of the lens block displaces finger 58 of slide advancing member 17 toward the slide discharging channel member, thereby moving the slides within the gate laterally in unison with the corresponding lateral movement of the lens system. Accordingly, those slides designated by numerals 15(c) and 15(d) remain respectively in alignment with the lens systems 46 and 47 throughout such lateral movement of the latter. As the two lens systems and the respective slides 15(c) and 15(d) thus move laterally in unison, it will be seen that the transparency of slide 15(c) moves out of the projection aperture as the transparency of slide 15(d) simultaneously enters that aperture. Therefore, images of both slide transparencies appear temporarily superimposed on the projection screen as the image projected from slide 15(c) fades out of view and is replaced by the image projected from slide 15(d). This "lap dissolve" effect is accompanied by a corresponding lateral movement of the projected images of the slides on the screen; but since such movement is not magnified by the lens systems, it is substantially unnoticeable on the screen.

When the lens block arrives at the position shown in FIG. 4, finger 58 is received in notch 69 in end plate 37; with lens system 47 and slide 15(d) being centrally aligned with the projection aperture. Accordingly, the image of slide 15(d) alone is projected on the viewing screen. Since bearing segments 44 are now in contact with the adjacent internal cylindrical surfaces of the end ribs of the lens support block, that block can move no further toward the slide discharging channel member but can rotate in a clockwise direction under the continuing influence of rotating pinion gear 53, as illustrated in FIG. 5. During such rotational movement of the lens block, lens system 47 rotates about its axis and therefore produces no noticeable effect on the projected image of slide 15(d). However, as will be apparent by reference to FIG. 5, the rotational movement of the lens block allows slide advancing member 17 gradually to return to its former position shown in FIGS. 1, 2 and 3 as finger member 58 remains in contact with the adjacent peripheral surface of the lens block under the resilient influence of spring 21. When the slide advancing member has return to its former position, the slide pack in the slide receiving channel is moved forwardly by the spring loaded follower member 16 so that slide 15(f) then is aligned in tandem fashion with slide 15(e) in the gate member and is engaged laterally with hook member 22. Upon completion of the 180° orbital movement of lens system 46 about the axis of lens system 47 to the position shown in FIG. 6, the projector components are again in the same condition shown in FIGS. 1, 2 and 3 except that the positions of the lens systems have been reversed and all of the slides have been advanced by one position. As previously mentioned, the gear ratio between pinion gear 53 and gear member 51 surrounding the lens support block is one half as great as that between pinion gear 53 and gear member 51 surround-gear 60 is rotated only through one complete revolution each time the single revolution clutch is engaged, the rotation of pinion gear 53 therefore ceases as soon as the lens block arrives at the position shown in FIG. 6. consequently, slide 15(d) continues to be displayed until the clutch again is engaged, whereupon the same slide changing process is repeated to advance slide 15(e) into projection position in alignment with lens system 46.

After successive repetition of the above-described slide changing cycle has caused the last slide in the slide pack to enter the slide gate member, the absence of a slide at the forward end of the slide receiving channel member precludes the illustrated slide advancing mechanism from performing until additional slides are loaded into the projector. However, it should be apparent that auxiliary slide advancing means could be provided to advance the last few slides through the gate member; thereby allowing each slide pack to be displayed entirely before another pack is loaded into the machine. Furthermore, it should be recognized also that the symmetrical construction of the lens block and its supporting structure makes it possible to adapt the projector to feed the slides selectively in either direction by providing a reversible drive mechanism in conjunction with a bi-directionally operable slide transporting system.

As previously mentioned, the same type of lap dissolve optical system also can be employed readily in projectors adapted to display successive frames provided along an elongate film strip and likewise can include means for reversing the order in which the successive frames are moved into projection position. Additionally, it should be apparent that the same principal of operation might be practiced by means of different arrangements for transporting the projection lens systems involved, which could include more than just two sets of lenses.

The invention has been described in detail with particular reference to a preferred embodiment thereof, but it will be understood that variations and modifications can be effected within the spirit and scope of the invention as described hereinbefore and as defined in the appended claims.

I claim:

1. In a slide projector having guide means adapted to define a guide path along which a plurality of tandemly arranged uniformly spaced image bearing surfaces are laterally movable in unison, the combination comprising:
   advancing means for intermittently moving such plurality of tandemly arranged uniformly spaced image bearing surfaces unidirectionally along the guide path in unison, so that each of such surfaces in turn sequentially occupies first, second, and third positions along the guide path,
   an optical system comprising a plurality of objective lens units, and
   lens units transporting means operatively coordinated with said advancing means to move said lens units laterally along a predetermined orbital path so that each of said lens units in turn is sequentially
      (1) located at a first lens location in alignment with an image bearing surface occupying said first position,
      (2) maintained in alignment with that image bearing surface and moved in unison therewith to second and third lens locations corresponding respectively to said second and third positions sequentially occupied by such image bearing surface along said guide path, and
      (3) returned from said third lens location to said first lens location, thereby aligning it with another image bearing surface then occupying said first position.

2. A projector according to claim 1 including a light source and condenser means for directing light from said light source into a light beam broadened in the direction of said guide path to illuminate an elongate generally rectangular region along said guide path corresponding generally to the area covered by two adjacent image bearing surfaces positioned in tandem relation to each other midway between said first and third positions along said guide path.

3. A projector according to claim 1 adapted to accommodate image bearing surfaces comprising respective individual slides movable in tandem relation along said guide path in supported engagement with said guide means, said projector including;
   slide supply means at one end of said guide means for supporting a plurality of mutually aligned slides,
   slide receiving means at the opposite end of said guide means for supporting a plurality of mutually aligned slides, and
   means including said advancing means for
      (1) feeding slides in sequence from said slide supply means into said guide means at said one end thereof,
      (2) advancing such slides in said guide means sequentially along said guide path, and
      (3) feeding such slides in sequence from said other end of said guide means into said slide receiving means.

4. A projector according to claim 1 in which said optical system comprises two objective lens units mounted in fixed laterally spaced relation to one another by a movable mounting member, said lens transporting means including support means supporting said mounting member for transverse movement during which both of said two objective lens units are maintained in alignment with respective image bearing surfaces moving along said guide path and also for pivotal movement about the axis of the one of said lens units located at said second location to return the other of said lens units along said orbital path from said third location to said first location.

5. A projector according to claim 4 including drive means for alternately moving said mounting member transversely and pivotally to thereby move said two lens units sequentially along said orbital path.

6. A projector according to claim 5 including linking means adapted to connect said mounting member operatively with said advancing means to translate movement of said mounting member by said drive means into movement of image bearing surfaces along said guide path by said advancing means.

7. The invention according to claim 1 in which said optical system comprises two objective lens units mounted in fixed laterally spaced relation to one another by a movable mounting member, said lens transporting means including support means supporting said mounting member for transverse movement during which both of said two objective lens units are maintained in alignment with respective image bearing surfaces moving along said guide path and also for pivotal movement about the axis of the one of said lens units located at said second location to return the other of said lens units along said orbital path from said third location to said first location, drive means for alternately moving said mounting member transversely and pivotally to thereby move said two lens units sequentially along said orbital path, and linking means adapted to connect said mounting member operatively with said advancing means to translate movement of said mounting member by said drive means into movement of using bearing surfaces along said guide path by said advancing means, said advancing means comprising a reciprocally movable slide advancing member biased toward said mounting member, and said linking means comprising a laterally extending arm on said slide advancing member biased into engagement with the periphery of said mounting member.

8. A projector according to claim 7 in which said drive means includes an elongate endless gear element surrounding both of said two lens units and meshed with a rotatable pinion adjacent said second lens location.

9. A projector comprising in combination
a light source,
guide means adapted to receive image bearing means so as to support two image bearing regions thereof in predetermined relation to one another, and
means for moving said image bearing means along said guide means to move said image bearing regions in unison from
(1) a first position at which one but not the other of said image bearing regions is illuminated by said light source, to
(2) a second position at which said other but not said one of said image bearing regions is illuminated by said light source, the improvement comprising:
two laterally movable lens units, and
means for locating said lens units in a normal position in which each lens unit is in optical alignment with a respective one of said image bearing regions at said first position and for moving said lens units in unison with each other and with said image bearing means to maintain such alignment as said image bearing regions are moved from said first position to said second position wherein said light source illuminates at least a part of each of said image bearing regions simultaneously during said movement from said first to said second position.

10. The invention according to claim 9 wherein said lens units are mounted in laterally spaced relation within a movable mounting member, said locating means comprises means for supporting said mounting member for transverse movement during which both of said two objective lens units are maintained in alignment with respective image bearing regions moving along said guide means and also for pivotal movement about the axis of one of said lens units when said image bearing regions are at said second position to return said mounting member and lens units along an orbital path to said normal position.

References Cited
UNITED STATES PATENTS

| 3,218,920 | 11/1965 | Johnson | 353—83 |
| 3,264,937 | 8/1966 | Antos | 353—83 |

LEONARD FORMAN, Primary Examiner

S. L. STEPHAN, Assistant Examiner

U.S. Cl. X.R.

350—147